US010355395B2

(12) United States Patent
Hashimoto et al.

(10) Patent No.: US 10,355,395 B2
(45) Date of Patent: Jul. 16, 2019

(54) WIRE WITH TERMINAL

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Tsutomu Hashimoto, Mie (JP); Hiroki Hirai, Mie (JP); Kosuke Sone, Mie (JP); Toshikazu Saba, Mie (JP); Yasuto Takeda, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 0 days.

(21) Appl. No.: 15/997,799

(22) Filed: Jun. 5, 2018

(65) Prior Publication Data

US 2019/0089089 A1 Mar. 21, 2019

(30) Foreign Application Priority Data

Sep. 21, 2017 (JP) ................................ 2017-181593

(51) Int. Cl.

| | |
|---|---|
| ***H02G 15/00*** | (2006.01) |
| ***H01R 13/52*** | (2006.01) |
| ***H01R 4/70*** | (2006.01) |
| ***H01R 11/11*** | (2006.01) |
| ***H01R 13/42*** | (2006.01) |
| ***H01R 13/502*** | (2006.01) |

(Continued)

(52) U.S. Cl.

CPC ........... *H01R 13/5205* (2013.01); *H01R 4/70* (2013.01); *H01R 11/11* (2013.01); *H01R 13/42* (2013.01); *H01R 13/502* (2013.01); *H01R 13/642* (2013.01); *H01R 4/185* (2013.01); *H01R 13/113* (2013.01)

(58) Field of Classification Search

CPC ......... H02G 15/22; H02G 15/00; H01R 13/52
USPC ...... 174/74 R, 84 R, 23 R, 76; 439/587, 274
See application file for complete search history.

(56) References Cited

U.S. PATENT DOCUMENTS 3,854,789 A * 12/1974 Kaplan ................ H01R 9/0521 439/584
4,225,206 A * 9/1980 Roman, Jr. ........ H01R 13/6273 439/274

(Continued)

*Primary Examiner* — Hien D Vu
(74) *Attorney, Agent, or Firm* — Gerald E. Hespos; Michael J. Porco; Matthew T. Hespos

(57) ABSTRACT

A wire with terminal (1) includes a single-core wire (3), a connector terminal (2) and a seal (5). The wire (3) includes one conductor (31) and an insulation coating layer (32) covering the conductor (31). The wire (3) is formed with a conductor portion (310) that is part of the conductor (31) projecting from an end of the insulation coating layer (32). The connector terminal (2) is connected to the conductor portion (310) and arranged in an insertion hole (71) in a case (7). The seal (5) is mounted on an outer periphery of the conductor portion (310) and in the insertion hole (71) and closes a clearance (S1) between the inner periphery of the seal (5) and the outer periphery of the conductor portion (310) and a clearance (S2) between the outer periphery of the sealing member (5) and the inner periphery of the insertion hole (71).

9 Claims, 4 Drawing Sheets

(51) Int. Cl.

| | |
|---|---|
| ***H01R 13/642*** | (2006.01) |
| *H01R 4/18* | (2006.01) |
| *H01R 13/11* | (2006.01) |

(56) References Cited

U.S. PATENT DOCUMENTS

| | | | | |
|---|---|---|---|---|
| 4,698,028 | A * | 10/1987 | Caro | H01R 9/0521 439/271 |
| 5,011,432 | A * | 4/1991 | Sucht | H01R 9/05 439/584 |
| 6,321,021 | B1 * | 11/2001 | Cairns | G02B 6/4428 385/135 |
| 6,334,798 | B1 * | 1/2002 | Ushijima | H01R 4/187 439/203 |
| 2009/0272188 | A1 | 11/2009 | Byrne et al. | |
| 2011/0045697 | A1 | 2/2011 | Naohito | |

* cited by examiner

WIRE WITH TERMINAL

BACKGROUND

Field of the Invention

The invention relates to a wire with terminal in which a connector terminal is provided on an end part of a wire.

Description of the Related Art

A wire with terminal is used to wire various electronic devices to a control device in an automotive vehicle or the like. The wire with terminal is composed of a connector terminal to be inserted into a connector case and a wire connected to the connector terminal and obtained by bundling a plurality of conductors. Some of electronic devices wired using wires with terminals are exposed to a liquid, such as oil or water. A liquid that contacts an end part of the wire connected to the electronic device is known to penetrate through gaps between the conductors of the wire by a capillary phenomenon, as explained in Japanese Unexamined Patent Publication No. 2009-272188.

The liquid penetrating through the gaps between the conductors from the end part of the wire on the electronic device side penetrates up to an opposite end part of the wire and further tries to enter a control device. Accordingly, Japanese Unexamined Patent Publication No. 2009-272188 forms a core exposed portion on an end part of a wire on a control device side. The core exposed portion has a core composed of a plurality of strands (conductors). A waterproofing agent is filled among the strands of the core exposed portion and the core exposed portion that has been filled with this waterproofing agent is covered by a waterproof sheet. The waterproofing agent prevents the liquid from penetrating up to the connector terminal provided on the end part of the wire, thereby preventing the entrance of the liquid into the control device.

However, Japanese Unexamined Patent Publication No. 2009-272188 requires an insulation coating at an intermediate position of the wire to be stripped to form the core exposed portion. This stripping is performed while leaving the insulation coating on the end part of the wire and efficiency is poor. Further, Japanese Unexamined Patent Publication No. 2009-272188 requires the waterproofing agent that has been filled among the strands of the core exposed portion to be cured and then requires the cured waterproofing agent to be covered by the waterproof sheet. Thus, many man-hours are required to manufacture the wire with terminal and operability is poor.

The invention was developed in view of such a problem and aims to prevent the penetration of a liquid to a connector terminal and improving operability and productivity during manufacturing.

SUMMARY

One aspect of the invention relates to a wire with terminal, comprising: a wire including at least one conductor and an insulation coating layer at least partly covering the conductor. A connector terminal is connected to a conductor portion and is arranged in an insertion hole in a connector case. A sealing member is provided on an outer periphery of a conductive wire portion. The sealing member is arranged in the insertion hole and is configured to close a clearance between the sealing member and the conductive wire portion and a clearance between the sealing member and the insertion hole. The conductive wire portion is part of the at least one conductor and has substantially no gap formed therein.

The wire may be a single core wire including one single conductor, and the conductive wire portion may be part of the conductor portion to be connected to the connector terminal.

The wire may include a plurality of bundled conductors; and the conductive wire portion may comprise a mounting portion formed to fill up gaps among the conductors in the conductor portion in at least a part of the conductor portion in a longitudinal direction and/or cover the conductor portion over a substantially entire circumference. The conductor portion may be part of the conductors projecting from an end part of the insulation coating layer.

The sealing member may include a connecting outer peripheral portion to be connected to a terminal connecting portion provided on the connector terminal and/or at least one sealing portion configured to close the insertion hole.

The connector terminal may be formed with a further terminal connecting portion connected to the outer periphery of the conductor portion, such as by caulking.

According to another aspect, there is further provided a connector device comprising: a connector case having at least one insertion hole, the above-described wire with terminal and a connector terminal at least partly arranged in the insertion hole.

According to the above, the penetration of a liquid from the single-core wire to the connector terminal is prevented by having the conductive wire portion using the single-core wire instead of a wire including a plurality of bundled cores and using the sealing member mounted on the outer periphery of the conductor portion of the single-core wire. Furthermore, since the single-core wire is used, a liquid such as oil or water is less likely to penetrate into the single-core wire from an end part of the single-core wire on an electronic device side in the wire with terminal. However, this liquid may enter a clearance between the conductor and the insulation coating layer and penetrate to an end part of the single-core wire on a connector terminal side by a capillary phenomenon.

When the liquid penetrating into the clearance between the conductor and the insulation coating layer reaches the conductor portion, this liquid tries to penetrate up to the connector terminal along the outer periphery of the conductor portion. At this time, since the clearance between the inner periphery of the sealing member and the outer periphery of the conductor portion and the clearance between the outer periphery of the sealing member and the inner periphery of the insertion hole are closed by the sealing member, the liquid cannot penetrate up to the connector terminal. In this way, the entrance of the liquid into a control device or the like from the connector terminal and the connector case is prevented.

Further, the connector terminal and the conductor portion of the wire can be connected electrically by various methods such as caulking (crimping), welding and soldering. Further, the number of steps in mounting the sealing member on the outer periphery of the conductor portion is small. Thus, operability in electrical connection and mounting is improved and productivity in manufacturing the wire with terminal is also improved.

Thus, the penetration of the liquid to the connector terminal can be prevented and operability and productivity during manufacturing can be improved.

Furthermore, the wire including the plurality of conductors is used instead of the single-core wire and the mounting portion is formed on a part of the conductor portion where the sealing member is to be mounted.

Accordingly, a fluid, particularly a liquid such as oil or water, penetrating through gaps among the conductors of the wire from an end part of the wire on an electronic device side in the wire with terminal tries to penetrate to an end part of the wire on a connector terminal side by a capillary phenomenon. At this time, since the conductor portion of the wire is formed with the mounting portion filling up the gaps among (i.e. voids between) the conductors, the liquid penetrating through the gaps among the conductors cannot penetrate into the mounting portion (conductive wire portion).

The liquid having reached the mounting portion tries to penetrate up to the connector terminal along the outer periphery of the mounting portion. At this time, since the clearance between the inner periphery of the sealing member and the outer periphery of the mounting portion and the clearance between the outer periphery of the sealing member and the inner periphery of the insertion hole are closed by the sealing member, the liquid cannot penetrate up to the connector terminal. In this way, the entrance of the liquid into a control device or the like from the connector terminal and the connector case is prevented.

Further, the connector terminal and the conductor portion of the wire can be electrically connected by various methods such as caulking (crimping), welding and soldering. Further, the number of steps in mounting the sealing member on the outer periphery of the mounting portion is small. Thus, operability in electrical connection and mounting is improved and productivity in manufacturing the wire with terminal is also improved.

Thus, according to the above, the penetration of the liquid to the connector terminal can be prevented and operability and productivity during manufacturing can be improved.

Note that a harness component used in an automotive vehicle or the like can be formed by using a plurality of wires with terminals and a connector case provided with a plurality of insertion holes. The harness component is formed by bundling the respective wires with terminals inserted into the respective insertion holes of the connector case with each other.

These and other objects, features and advantages of the invention will become more apparent upon reading the following detailed description of preferred embodiments and accompanying drawings. It should be understood that even though embodiments are described separately, single features thereof may be combined to additional embodiments.

DETAILED DESCRIPTION

First Embodiment

Figure 1:
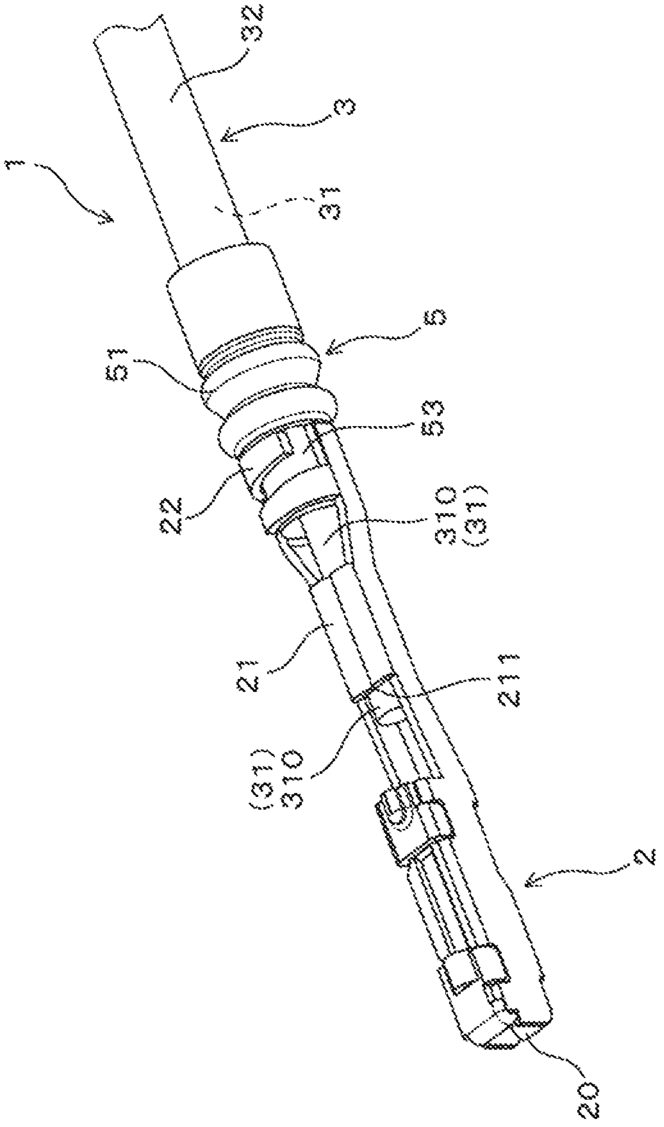
FIG. 1 is a perspective view showing a wire with terminal according to a first embodiment.
Figure 2:
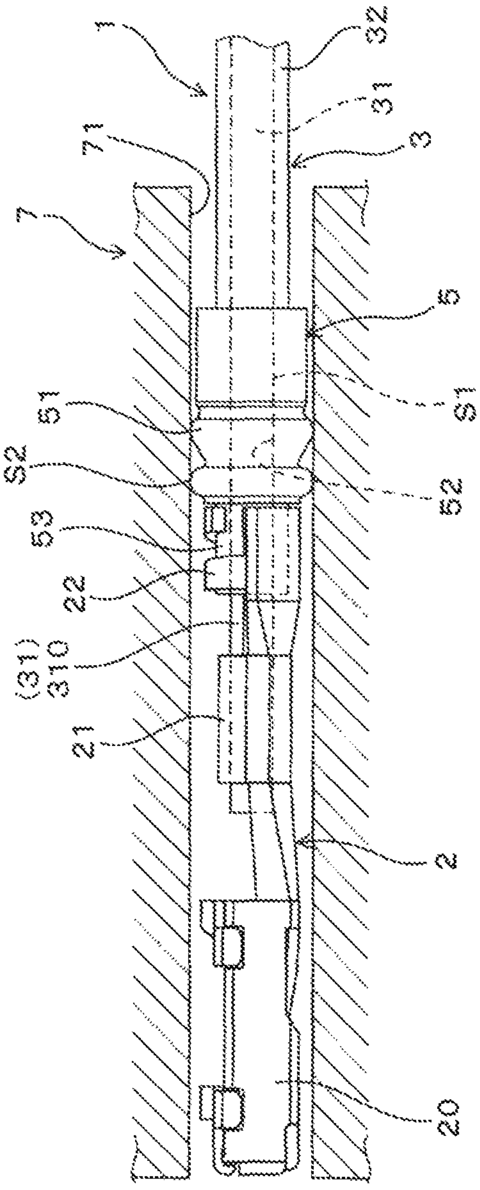
FIG. 2 is a section showing the wire with terminal inserted into an insertion hole of a connector case according to the first embodiment.
Figure 3:
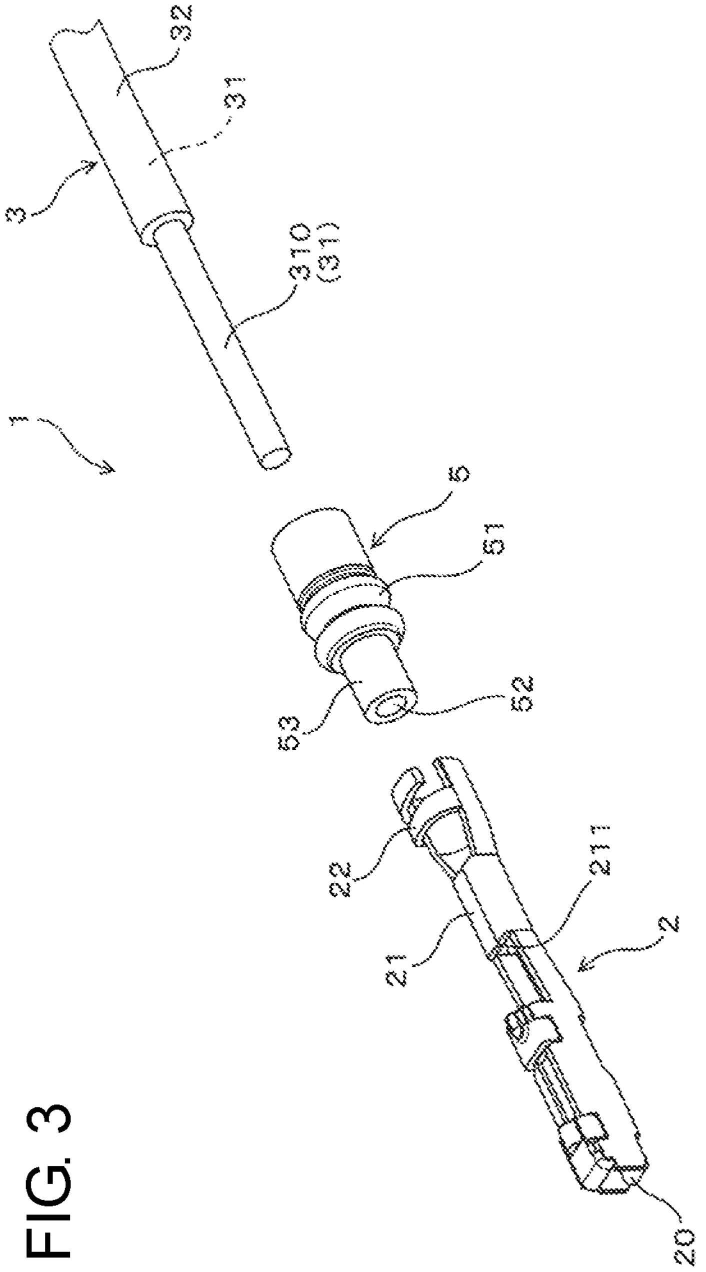
FIG. 3 is a perspective view showing each constituent component of the wire with terminal according to the first embodiment.

As shown in FIGS. 1 to 3, a wire with terminal 1 of this embodiment includes a single-core wire 3, a connector terminal 2 and a sealing member 5. The single-core wire 3 includes one conductor 31 and an insulation coating layer 32 covering the conductor 31. The single-core wire 3 is formed with a conductor portion 310, which is a part of the conductor 31 projecting from an end part of the insulation coating layer 32. The connector terminal 2 is connected to the conductor portion 310 and inserted in an insertion hole 71 provided in a connector case 7. The sealing member 5 is mounted on the outer periphery of the conductor portion 310, arranged in the insertion hole 71 and closes a clearance S1 between the inner periphery of the sealing member 5 and the outer periphery of the conductor portion 310 and a clearance S2 between the outer periphery of the conductor portion 310 and the inner periphery of the insertion hole 71.

The wire with terminal 1 of this embodiment is described in detail below.

(Wire with Terminal 1)

The wire with terminal 1 is used to wire an electronic device such as an actuator or a sensor used in an automotive vehicle such as a four-wheeled automotive vehicle or a two-wheeled automotive vehicle to a control device for controlling the electronic device. Wires with terminals 1 are mounted into the connector case 7. The wires with terminals 1 and the connector case 7 are integrated to form a harness component.

The wire with terminal 1 of this embodiment is used to connect an automatic transmission as an electronic device installed in the automotive vehicle to an electronic control unit (ECU) as the control device. In the automatic transmission, oil (working oil) for a control operation of the automatic transmission is used. An end part of the single-core wire 3 on an electronic device side in the wire with terminal 1 is connected to a valve body of the automatic transmission. The end part of this single-core wire 3 on the electronic device side is immersed in the oil. The valve body is for controlling an operation in a hydraulic circuit of the automatic transmission and includes a solenoid valve as an actuator and a plurality of spool valves configured to slide by turning on and off energization to the solenoid valve.

(Connector Case 7)

The connector case 7 into which the plurality of wires with terminals 1 are mounted is arranged on the automatic transmission or the like and attached to a mating connector provided in the electronic control unit. A plurality of the insertion holes 71 into which the connector terminals 2 are inserted to be held are formed side by side in a lateral direction in the connector case 7. The mating connector is provided with conductor pins to be connected to the respective connector terminals 2.

Note that each connector terminal 2 arranged in the connector case 7 may be connected to the electronic control unit via a wire. Further, the connector case 7 having the plurality of wires with terminals 1 mounted therein and the mating connector can be used as a relay connector for electrically connecting the valve body and the electronic control unit.

(Single-Core Wire 3)

As shown in FIGS. 2 and 3, the single-core wire 3 is formed by one solid conductor 31 covered by the insulation coating layer 32. The conductor 31 is formed of a conductive metal material, and the insulation coating layer 32 is formed of a material such as insulating rubber or resin. The insulation coating layer 32 is removed on an end part of the single-core wire 3 on a side to be connected to the connector terminal 2, and the conductor portion 310 in which the conductor 31 is exposed on the outer periphery is formed on this end part. The conductor 31 exposed at the conductor portion 310 forms a conductive wire portion on which the sealing member 5 is to be provided, as described below. Note that the exposure of the single-core wire 3 means that the conductor portion 310 forms an outermost part of the single-core wire 3 when the single-core wire 3 is singly viewed. The outer peripheral surface of at least the conductor portion 310 of the conductor 31 is formed into a smooth cylindrical surface.

(Connector Terminal 2)

The connector terminal 2 is made of a conductive metal material. The connector terminal 2 is formed of a bent sheet metal. The connector terminal 2 includes an insertion hole 20 into which the conductor pin provided in the mating connector is inserted, and functions as a female terminal. Note that the connector terminal 2 may be formed as a male terminal such as a conductor pin and the mating connector may be provided with a female terminal into which the mating terminal is inserted.

Further, as shown in FIG. 1, the connector terminal 2 is formed with a first terminal connecting portion 21 connected to the outer periphery of a tip part of the conductor portion 310 and a second terminal connecting portion 22 adjacent to the first terminal connecting portion 21 and connected to the outer periphery of the sealing member 5. The first and second terminal connecting portions 21, 22 of this embodiment are formed as caulking portions. The first and second terminal connecting portions 21, 22 are formed to embrace the sealing member 5 from both sides in a circumferential direction.

A biting portion 211 configured to bite into the outer periphery of the tip part of the conductor portion 310 is formed on an end part of the first terminal connecting portion 21. The connector terminal 2 of this embodiment is formed as a caulking terminal (crimping terminal) to be caulked (crimped) to the conductor portion 310. The connector terminal 2 may be joined to the conductor portion 310 by welding, soldering or the like besides by caulking.

(Sealing member 5)

As shown in FIGS. 2 and 3, the sealing member 5 is made of a material such as resiliently deformable rubber or resin. The sealing member 5 includes a connecting outer peripheral portion 53 to be connected to the second terminal connecting portion 22 provided on the connector terminal 2 and a sealing portion 51 configured to close the insertion hole 71. The sealing portion 51 is provided over the entire circumference of the sealing member 5 and is configured to be brought in contact with the insertion hole 71 of the connector case 7 over the entire circumference. A center hole 52 into which the conductor portion 310 is inserted is formed in a central part of the sealing member 5.

An outer diameter of the sealing portion 51 of the sealing member 5 is a maximum outer diameter in the entire wire with terminal 1. A maximum width of the connector terminal 2 in a direction perpendicular to a longitudinal direction (axial direction) is smaller than the outer diameter of the sealing portion 51. The sealing member 5 is mounted on the conductor portion 310 located closer to the connector terminal 2 than the insulation coating layer 32 of the single-core wire 3 in the longitudinal direction of the wire with terminal 1. The insulation coating layer 32 of the single-core wire 3 is not arranged inside the sealing member 5.

(Manufacturing Method)

The wire with terminal 1 can be manufactured (assembled) as follows.

First, the insulation coating layer 32 on the end part of the single-core wire 3 on the side of the connector terminal 2 is removed to expose the conductor 31 on this end part as the conductor portion 310 or more specifically the conductive wire portion of the conductor portion 310. As the conductive wire portion in this embodiment is made up of (or part of) a single core conductor 31, no fluid can pass through its inner part. Then, the sealing member 5 is mounted on the outer periphery of the conductor portion 310. At this time, the sealing member 5 is resiliently deformed to enlarge a diameter and this sealing member 5 is mounted from the tip part of the conductor portion 310 (as the conductive wire portion). It should be understood, that alternatively the sealing member 5 may be co-molded on the conductive wire portion or conductor portion 310. Further, when the sealing member 5 is mounted on the conductor portion 310, the tip part of the conductor portion 310 projects from the sealing member 5.

Subsequently, the tip part of the conductor portion 310 is inserted into the first terminal connecting portion 21 of the connector terminal 2 and the connecting outer peripheral portion 53 of the sealing member 5 is inserted into the second terminal connecting portion 22. Then, the respective terminal connecting portions 21, 22 are deformed using a tool or the like, the first terminal connecting portion 21 is caulked (i.e. crimped/deformed) to the outer periphery of the tip part of the conductor portion 310 and the second terminal connecting portion 22 is caulked to the outer periphery of the connecting outer peripheral portion 53. In this way, the wire with terminal 1 is manufactured in which the connector terminal 2 and the sealing member 5 are provided on the end part of the single-core wire 3.

Thereafter, the end part of each wire with terminal 1 where the connector terminal 2 and the sealing member 5 are provided is inserted into the insertion hole 71 of the connector case 7. At this time, the clearance S2 between the outer periphery of the sealing member 5 and the inner periphery of the insertion hole 71 is closed. Further, the sealing member 5 is compressed by the insertion hole 71, whereby the inner periphery of the sealing member 5 and the outer periphery of the conductor portion 310 are held in closer contact.

Note that the assembling of the wire with terminal 1 and the mounting of the wire with terminal 1 into the connector case 7 may be performed by a worker or a control machine such as a robot.

Next, functions and effects of the wire with terminal 1 of this embodiment are described.

In the wire with terminal 1 of this embodiment, the penetration of a fluid (particularly liquid) from the single-core wire 3 to the connector terminal 2 is prevented by using the single-core wire 3 instead of a wire including a plurality of bundled conductors and using the sealing member 5 mounted on the outer periphery of the conductor portion 310 of the single-core wire 3.

The end part of the single-core wire 3 on the electronic device side in the wire with terminal 1 is connected to the actuator in the valve body. This end part in use is immersed in the oil as the liquid used in the valve body. Further, in the wire with terminal 1 of this embodiment, the oil is less likely to penetrate into the inside of the single-core wire 3 from the end part of the single-core wire 3 on the electronic device side in the wire with terminal 1 since the single-core wire 3 is used. However, this oil may enter a clearance between the conductor 31 and the insulation coating layer 32 and penetrate to the end part of the single-core wire 3 on the side of the connector terminal 2 by a capillary phenomenon.

If the oil penetrating through the clearance between the conductor 31 and the insulation coating layer 32 reaches the conductor portion 310, this oil tries to penetrate up to the connector terminal 2 along the outer periphery of the conductor portion 310. At this time, as shown in FIG. 2, the clearance S1 between the inner periphery of the sealing member 5 and the outer periphery of the conductor portion 310 and the clearance S2 between the outer periphery of the sealing member 5 and the inner periphery of the insertion hole 71 are closed by the sealing member 5, whereby the oil cannot penetrate to either one of an inner peripheral side of the sealing member 5 and an outer peripheral side of the sealing member 5. Thus, the oil cannot penetrate up to the connector terminal 2. In this way, the entrance of the liquid into the electronic control unit from the connector terminal 2 and the connector case 7 is prevented.

Further, the connector terminal 2 and the single-core wire 3 can be electrically connected by caulking the respective terminal connecting portions 21, 22 of the connector terminal 2. Further, the sealing member 5 can be mounted on the outer periphery of the conductor portion 310 by being resiliently deformed, whereby the sealing member 5 is easily mounted on the outer periphery of the conductor portion 310. The sealing member 5 can be mounted by one step and the number of steps therefor is small. Therefore, operability in electrical connection and mounting is improved and productivity in manufacturing the wire with terminal 1 is also improved.

Thus, according to the wire with terminal 1 of this embodiment, the penetration of the fluid (liquid) to the connector terminal 2 can be prevented and operability and productivity during manufacturing can be improved.

Besides the automatic transmission, one of various devices utilizing a liquid such as oil or water can be used as the electronic device using the wire with terminal 1. One of various liquids other than oil such as coolant may be, for example, the liquid penetrating through the clearance between the conductor 31 and the insulation coating layer 32 of the single-core wire 3 in the wire with terminal 1.

Further, if the connector case 7 or the wire with terminal 1 is exposed to a liquid such as oil or water from outside, the sealing member 5 can also prevent the penetration of this liquid to the connector terminal 2. In this case, the entrance of the liquid into the connector terminal 2 is impeded at both inner and outer peripheries of the sealing member 5.

Second Embodiment

In this embodiment, a wire with terminal 1 in which a processed wire 3A including a plurality of conductors 31A is used instead of the single-core wire 3 is shown.

Figure 4:
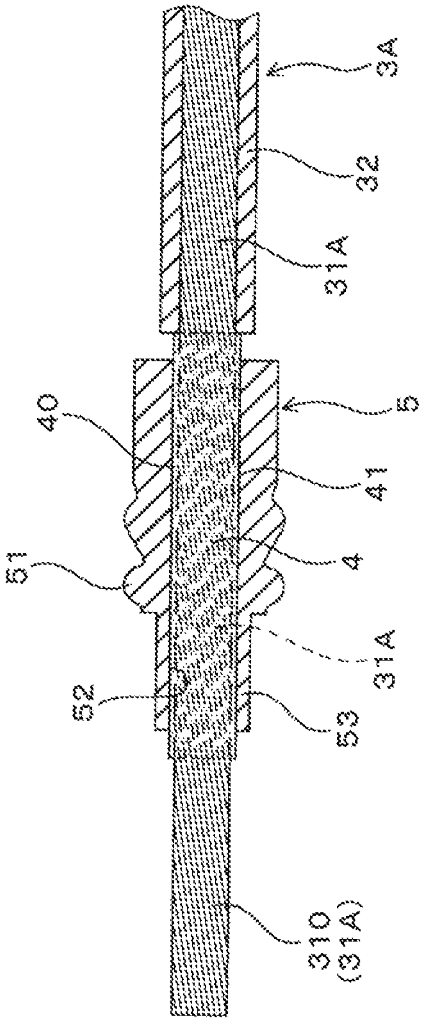
FIG. 4 is a perspective view showing a wire with terminal according to a second embodiment.

As shown in FIG. 4, the wire 3A of this embodiment includes the plurality of bundled conductors 31A and an insulation coating layer 32 covering the plurality of conductors 31A. The wire 3A is formed by a twisted wire obtained by entirely twisting the plurality of bundled conductors 31A. A conductor portion 310 of this embodiment is formed by the plurality of conductors 31A exposed on the outer periphery of an end part of the wire 3A. The conductor portion 310 is formed by removing the insulation coating layer 32 on the end part of the wire 3A.

A conductive wire portion of the wire 3A comprises a mounting portion 4 that is formed of a conductive material 40 filling up gaps among the plurality of conductors 31A in the conductor portion 310 and covering the entire conductor portion 310 on one longitudinal part of the conductor portion 310 of this embodiment. Specifically, the conductor portion 310 is processed to form the mounting portion 4 having an outer peripheral surface (cylindrical surface) 41 for mounting the sealing member 5. The mounting portion 4 (conductive wire portion) is formed by substantially filling up the gaps among (i.e. voids between) the conductors 31A using the conductive material 40 in the longitudinal part of the conductor portion 310 and molding the conductive material 40 arranged over the entire circumference of the conductor portion 310 into the outer peripheral surface 41.

The mounting portion 4 of this embodiment is formed on a base end side part of the conductor portion 310. The conductive material 40 is arranged on the outer peripheral surface 41 of the mounting portion 4 and the conductive material 40 is molded to have an outer periphery having a circular cross-section. The outer peripheral surface 41 of the mounting portion 4 can be molded by clamping a part of the conductor portion 310 having the conductive material 40 and the like applied thereto by a mold.

The mounting portion 4 can also be formed using an insulating material instead of using the conductive material 40. In this case, since the plurality of conductors 31A in the conductor portion 310 are conductive, there is no problem even if a part other than the conductors 31A is made of the insulating material. Further, in this case, the mounting portion 4 is formed only on a part of the conductor portion 310 where the sealing member 5 is to be mounted, and the plurality of conductors 31A are exposed in a tip part of the conductor portion 310 to be connected to a connector terminal 2.

The mounting portion 4 formed using the conductive material 40 can be formed on the entire conductor portion 310 or at an appropriate position of the conductor portion 310 closer to a tip side part than the base end side part. In this case, the sealing member 5 is mounted on the mounting portion 4 and a first terminal connecting portion 21 of the connector terminal 2 is connected to the mounting portion 4.

As shown in FIG. 4, the connector terminal 2 of this embodiment is the same as in the case of the first embodiment. The sealing member 5 of this embodiment is mounted on the outer peripheral surface 41 of the mounting portion 4 and closes a clearance S1 between the inner periphery of the sealing member 5 and the outer periphery of the mounting portion 4 and a clearance S2 between the outer periphery of the sealing member 5 and the inner periphery of an insertion hole 71 when being inserted therein.

In the manufacturing of the wire with terminal 1 of this embodiment, after the insulation coating layer 32 on the end part of the wire 3A is removed to form the conductor portion 310, the outer peripheral surface 41 of the mounting portion 4 is molded using the conductive material 40 while the conductive material 4 is impregnated or spread into the gaps among the conductors 31A in the conductor portion 310. The other way of manufacturing the wire with terminal 1 is the same as in the case of the first embodiment.

Next, functions and effects of the wire with terminal 1 of this embodiment are described.

In the wire with terminal 1 of this embodiment, the wire 3A including the plurality of conductors 31A is used instead of using the single-core wire 3 and the mounting portion 4 (as a part of the conductive wire portion) with the filled-up spaces between the plurality of conductors 31A and/or the molded outer peripheral surface 41 is formed on the part of the conductor portion 310 where the sealing member 5 is to be mounted. In other words, the sealing member 5 is provided (particularly mounted) on the conductive wire portion where the gaps or voids between plurality of conductors 31A are filled so that no fluid can pass therethrough.

The end part of the wire 3A on an electronic device side in the wire with terminal 1 is connected to an actuator in a valve body. This end part is immersed in oil as a liquid used in the valve body. The oil penetrates through the gaps among the conductors 31A of the wire from the end part of the wire 3A on the electronic device side, and this liquid tries to penetrate to the end part of the wire 3A on the side of the connector terminal 2 by a capillary phenomenon. At this time, since the conductor portion 310 of the wire 3A is formed with the mounting portion 4 filling up the gaps among the conductors 31A, the oil penetrating through the gaps among the conductors 31A cannot penetrate into the mounting portion 4.

The oil having reached the mounting portion 4 tries to penetrate up to the connector terminal 2 along the outer periphery of the mounting portion 4. At this time, the clearance S1 between the inner periphery of the sealing member 5 and the outer periphery of the mounting portion 4 and the clearance S2 between the outer periphery of the sealing member 5 and the inner periphery of the insertion hole 71 are closed by the sealing member 5, whereby the oil cannot penetrate up to the connector terminal 2. In this way, the entrance of the liquid into a control device or the like from the connector terminal 2 and the connector case 7 is prevented.

Further, the connector terminal 2 and the wire 3A can be electrically connected by caulking the respective terminal connecting portions 21, 22 of the connector terminal 2. Further, the sealing member 5 can be mounted on the outer periphery of the mounting portion 4 by being resiliently deformed, whereby the sealing member 5 is easily mounted on the outer periphery of the mounting portion 4. The sealing member 5 can be mounted by one step and the number of steps therefor is small. Therefore, operability in electrical connection and mounting is improved and productivity in manufacturing the wire with terminal 1 is also improved.

Thus, also by the wire with terminal 1 of this embodiment, the penetration of the liquid to the connector terminal 2 can be prevented and operability and productivity during manufacturing can be improved.

Other configurations, functions, effects and the like in the wire with terminal 1 of this embodiment are the same as in the case of the first embodiment. Further, also in this embodiment, constituent elements denoted by the same reference signs as those shown in the first embodiment are the same as in the case of the first embodiment.

The invention is not limited only to the respective embodiments, and different embodiments are possible without departing from the scope of the invention. Further, the invention includes various modifications, modifications within the scope of equivalents.

REFERENCE SIGNS

1 wire with terminal
2 connector terminal
21 first terminal connecting portion
22 second terminal connecting portion
3 single-core wire
3A wire
31, 31A conductor
310 conductor (conductive wire)
32 insulation coating layer
4 mounting portion (conductive wire portion)
40 conductive material
41 outer peripheral surface
5 sealing member
51 sealing portion
53 connecting outer peripheral portion
7 connector case
71 insertion hole

What is claimed is:

1. A wire with terminal to be at least partly arranged in an insertion hole in a connector case, comprising:

a wire including at least one conductor and an insulation coating layer at least partly covering the at least one conductor, a selected length of the at least one conductor being exposed from an end of the insulation coating layer to define a conductive wire portion;

a sealing member having opposite first and second ends and a center hole extending between the first and second ends, the conductive wire portion being at least partly arranged in the center hole so that the sealing member closely engages and seals to an outer periphery of the conductive wire portion a connector terminal having a first terminal connecting portion connected to the conductive wire portion and a second terminal connecting portion connected to areas of an outer surface of the sealing member in proximity to the first end of the sealing member, an outer surface of the sealing member between the second terminal connecting portion and the second end of the sealing member being dimensioned for sealing engagement with the insertion hole in the connector case.

2. The wire with terminal of claim 1, wherein the wire is a single core wire including one single conductor.

3. The wire with terminal of claim 1, wherein:

the wire includes a plurality of bundled conductors;

the conductive wire portion comprises a mounting portion formed to fill up gaps among the plurality of conductors in the conductor portion along at least a part of the conductor portion in a longitudinal direction.

4. The wire with terminal of claim 1, wherein the first terminal connecting portion is connected to an outer periphery of the conductor portion by caulking.

5. A connector device comprising:

a connector case having at least one insertion hole;

a wire including at least one conductor and an insulation coating layer at least partly covering the at least one conductor, a selected length of the at least one conductor being exposed from an end of the insulation coating layer to define a conductive wire portion; and a sealing member having opposite first and second ends and a center hole extending between the first and second ends, the conductive wire portion being at least partly arranged in the center hole to seal an outer periphery of the conductive wire portion a connector terminal having a first terminal connecting portion connected to the conductive wire portion and a second terminal connecting portion connected to areas of an outer surface of the sealing member in proximity to the first end of the sealing member, the connector terminal being at least partly arranged in the at least one insertion hole of the connector case, an outer surface of the sealing member between the second terminal connecting portion and the second end of the sealing member being in sealing engagement with the insertion hole in the connector case.

6. The connector device of claim 5, wherein the wire is a single core wire including one single conductor.

7. The connector device of claim 5, wherein:

the wire includes a plurality of bundled conductors;

the conductive wire portion comprises a mounting portion formed to fill up gaps among the plurality of conductors in the conductor portion along at least a part of the conductor portion in a longitudinal direction.

8. The connector device of claim 5, wherein the first terminal connecting portion is connected to an outer periphery of the conductor portion by caulking.

9. The connector device of claim 8, wherein the connector terminal further includes a substantially rectangular tubular connecting portion projecting forward from the first terminal connecting portion.

* * * * *